United States Patent [19]
Kuroe et al.

[11] Patent Number: 4,989,190
[45] Date of Patent: Jan. 29, 1991

[54] APPARATUS FOR SEEKING A TRACK OF AN OPTICAL DISK IN WHICH INFORMATION IS RECORDED

[75] Inventors: Shigeru Kuroe; Takayuki Takeda; Masayasu Sato, all of Tokyo, Japan

[73] Assignee: Oki Electric Industry Co., Ltd., Tokyo, Japan

[21] Appl. No.: 221,411

[22] Filed: Jul. 19, 1988

[30] Foreign Application Priority Data

Jul. 20, 1987 [JP] Japan .................. 62-180394
Jul. 20, 1987 [JP] Japan .................. 62-180395

[51] Int. Cl.$^5$ .................. G11B 7/085; G11B 21/10
[52] U.S. Cl. .................. 369/32; 358/907; 369/58
[58] Field of Search .................. 358/342, 907; 369/32–33, 44, 46, 54–58, 111, 124, 44.26, 44.28; 360/78.04

[56] References Cited
U.S. PATENT DOCUMENTS

| | | | |
|---|---|---|---|
| 4,562,562 | 12/1985 | Moriya et al. | 369/33 X |
| 4,719,610 | 1/1988 | Bates et al. | 369/32 |
| 4,764,911 | 8/1988 | Morota et al. | 369/33 X |
| 4,811,316 | 3/1989 | Hosoya | 369/32 |
| 4,819,219 | 4/1989 | Nagano | 369/33 X |
| 4,866,687 | 9/1989 | Kasai et al. | 369/32 |

FOREIGN PATENT DOCUMENTS 60-48055 10/1985 Japan .

Primary Examiner—Aristotelis M. Psitos
Assistant Examiner—W. R. Young
Attorney, Agent, or Firm—Spencer & Frank

[57] ABSTRACT

A track-seeking apparatus for an optical disk drive seeks a target track by counting track crossings according to a track-crossing signal. The track-seeking apparatus also has means for detecting the ID fields on the disk and substituting a simulated track-crossing signal for the track-crossing signal in these fields, thus enabling high-speed seeking without track-count errors.

17 Claims, 13 Drawing Sheets

DIFFERENCE SIGNAL S58

SUM SIGNAL S59

DIFFERENCE SIGNAL S58

SUM SIGNAL S59

DIFFERENCE SIGNAL S58

THRESHOLD

BINARIZED DIFFERENCE SIGNAL S141

SUM SIGNAL S59

THRESHOLD

BINARIZED SUM SIGNAL S143

ID GATE SIGNAL

DIFFERENCE SIGNAL S58

FILTERED DIFFERENCE
SIGNAL S146

BINARIZED DIFFERENCE
SIGNAL S147

APPARATUS FOR SEEKING A TRACK OF AN OPTICAL DISK IN WHICH INFORMATION IS RECORDED

BACKGROUND OF THE INVENTION

This invention relates to a track-seeking apparatus for an optical disk drive, more particularly to a track-seeking apparatus capable of high-speed seeking as required, for example, in an optical disk drive used by a computer.

Optical disk are used for storing and retrieving a variety of information, including audio and video information and, more recently, computer data. FIG. 1 shows a schematic representation of an optical disk. The disk 1 has a plurality of tracks 2 on which the information is recorded. The tracks may have the form of concentric circles as illustrated in the drawings, or they may form a single continuous spiral, in which case a track consists of one 360-degree length (one complete turn) of the spiral.

Each track is identified by a unique number called the track address. If N is the number of tracks on the disk, the tracks are customarily numbered from 1, which is the outermost track, to N, which is the innermost track. The track address is recorded in an ID (identifier) field in the track. When information is stored on or retrieved from the disk 2, the track address of the desired track is specified, causing a track-seeking apparatus to seek this track so that it can be written into or read.

FIG. 2 is a block diagram showing the main components of a track-seeking apparatus in an optical disk drive. These include a motor 30; a light source 40; a pick-up unit 50; a driving means 60; an address reader 80; an input unit 90; and a control unit 100. The motor 30 rotates the disk at a constant rate. The light source 40 produces a light beam 41. The pick-up unit 50, which is mounted on the driving means 60 so that it can be moved back and forth in the direction of the arrow 70, focuses the light beam 41 onto the disk 1, detects the reflected light, and converts the detected light to one or more electrical pick-up signals S50 containing the information recorded on the disk, which it furnishes to the address reader 80 and the control unit 100. The pick-up signals S50 are also supplied to external equipment for reproducing the information on the disk. The address reader 80 extracts track address information from one of the pick-up signals S50 and sends this track address information to the input unit 90. The input unit 90 receives this track address information and external commands, such as the address of the track to be accessed, and exchanges control signals with the control unit 100. The control unit 100 also receives the pick-up signals S50; the function of the control unit 100 is to count the number of tracks moved or crossed by the pick-up unit 50 and send a drive control signal S100 to the driving means 60. The driving means 60 moves the pick-up unit 50 in accordance with this drive control signal S100.

The track-seeking apparatus in FIG. 2 operates as follows. When the input unit 90 receives a command to access a specified target track, first it obtains from the address reader 80 the address of the current track and performs a subtraction operation to determine the difference between the current track address and the target track address. The magnitude of this difference is the number of tracks the pick-up unit 50 must move or cross to reach to target track. The sign of the difference indicates the direction in which the pick-up unit 50 must move toward the center or toward the periphery of the disk 1. The input unit 90 sets the magnitude of the difference in a counter in the control unit 100 as an initial remaining track count, and sends the control unit 100 a direction signal indicating the desired direction of movement. From the remaining track count and direction signal, the control unit 100 generates a drive control signal S100 which causes the driving means 60 to move the pick-up unit 50 in the desired direction. From the pick-up signals S50, the control unit 100 also determines when the light beam 41 crosses a track on the disk 1, and decrements the remaining track count by one for each track crossed. When the remaining track count reaches 0, the drive control signal S100 causes the driving means 60 to stop moving the pick-up unit 50, and the control unit 100 notifies the input unit 90 that the seek operation is completed. The input unit 90 then obtains the address of the current track from the address reader 80 again to check that the correct target track has been reached. If it has not, the seek operation is repeated.

A key factor in the seek operation described above is the way in which the control unit 100 detects track crossings. FIG. 3 illustrates a prior-art scheme for detecting track-crossings as employed, for example, in the track-seeking apparatus described in Japanese Patent Application Publication No. 48055/1985. As shown in waveform (a) in FIG. 3, when the light beam 41 is directed onto a track, the pick-up signal S50 received by the control unit 100 contains high-frequency components reflecting the information recorded in the track, but when the light beam 41 is between tracks, the pick-up signal S50 is substantially flat. The control unit 100 contains an envelope detector which detects the envelope of the pick-up signal S50, thus generating waveform (b) in FIG. 3. A Schmitt trigger circuit in the control unit 100 converts the waveform (b) to a pulse waveform (c) which is supplied as input to the counter in the control unit 100, with one pulse corresponding to one track.

A problem with this prior-art scheme for detecting track crossings is that it does not work when the pick-up unit 50 moves so rapidly that the rate of track crossings approaches the frequency of the information components in the pick-up signal S50, for then the envelope of the pick-up signal S50 can no longer be detected correctly and tracks are miscounted. Accordingly, the motion of the pick-up unit 50 must be limited to a comparatively low velocity. This low velocity is adequate for disks containing audio and video information, because such information is usually accessed sequentially and the pick-up unit 50 rarely has to move between widely separated tracks. It is inadequate, however, for disks containing computer data, because computer data tend to be randomly located on the disk, requiring the pick-up unit 50 to move frequently between widely separated tracks.

SUMMARY OF THE INVENTION

An object of this invention is to provide, for use with an optical disk in which information is recorded in spiral or concentric circular tracks having ID fields, a track-seeking apparatus that enables high-speed seeking without track counting errors.

A track-seeking apparatus according to this invention is for use with an optical disk in which information is recorded in spiral or concentric circular tracks having data fields with pregrooves and ID fields with pits, and comprises:

means for rotating said optical disk;

a pick-up unit for focusing a light beam onto said optical disk, detecting the light reflected from said optical disk, and converting it to one or more pick-up signals;

driver means for moving said pick-up unit parallel to said optical disk and across said tracks; and a control circuit for receiving at least one of said pick-up signals and at least one of control signals, one of which is a seek count signal indicating the number of tracks the light beam must cross to reach the target track, and controlling said driver means according to said pick-up signals and control signals so that said driver means causes said pick-up unit to move from the current track to a target track, wherein said control circuit comprises:

track-crossing detection means for detecting track crossings by said light beam and generating a track-crossing signal;

velocity detection means for detecting the pick-up velocity at which said pick-up unit is moving and generating a pick-up velocity signal;

simulation means for generating a simulated track-crossing signal according to said pick-up velocity;

ID gating means for detecting when said light beam is focused on one of said ID fields;

a switch controlled by said ID gating means, for producing a track detect signal that consists of said track crossing signal when said light beam is not focused on one of said ID fields, and said simulated track-crossing signal when said light beam is focused on one of said ID fields; and means for terminating the seek operation when, as a result of counting the track detect signal, it finds that said number of tracks indicated by said seek count signal has been crossed.

DETAILED DESCRIPTION OF THE PREFERRED EMBODIMENTS

A first embodiment of the present invention will be described with reference to FIGS. 6 to 12. First, however, a more detailed description will be given of the optical disks used for storing computer data, and in particular of a magneto-optic disk, which is a type of disk that can be both written into and read.

Figure 4:
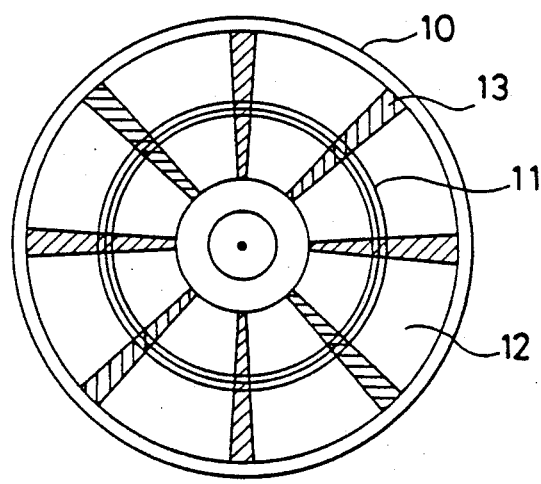
FIG. 4 is a schematic drawing of a magneto-optic disk.

FIG. 4 shows a schematic diagram of a magneto-optic disk 10. The tracks 11 are divided into radial sectors. Each sector comprises a data field 12 containing data and an ID field 13 containing information such as a preamble, track address, and sector address.

Figure 5:
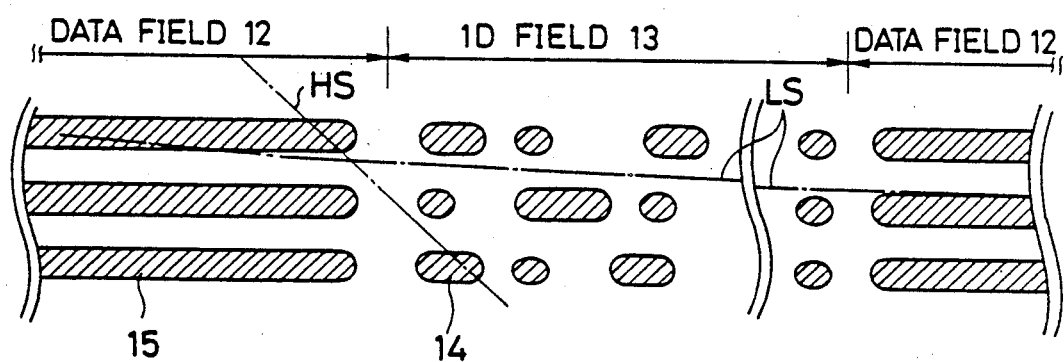
FIG. 5 is an enlarged view of part of the magneto-optic disk in FIG. 4.

FIG. 5 is an enlarged view of part of the magneto-optic disk 10 in FIG. 4, showing part of the ID field 13 and adjacent portions of the neighbouring data fields 12. The information in the ID fields is recorded in the form of pits 14, which are physical depressions formed when the disk is manufactured. In contrast, the data fields comprise pregrooves 15, which are guide grooves in which data can be written by using the light beam 41 to alter the reflective properties of the magneto-optic material of which the disk is made.

Figure 1:
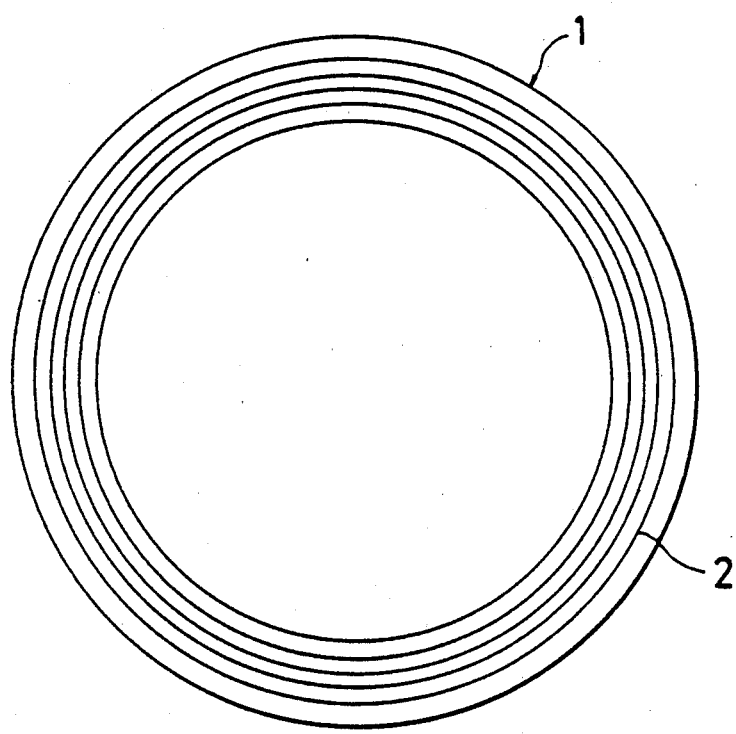
FIG. 1 is a schematic drawing of an optical disk.
Figure 2:
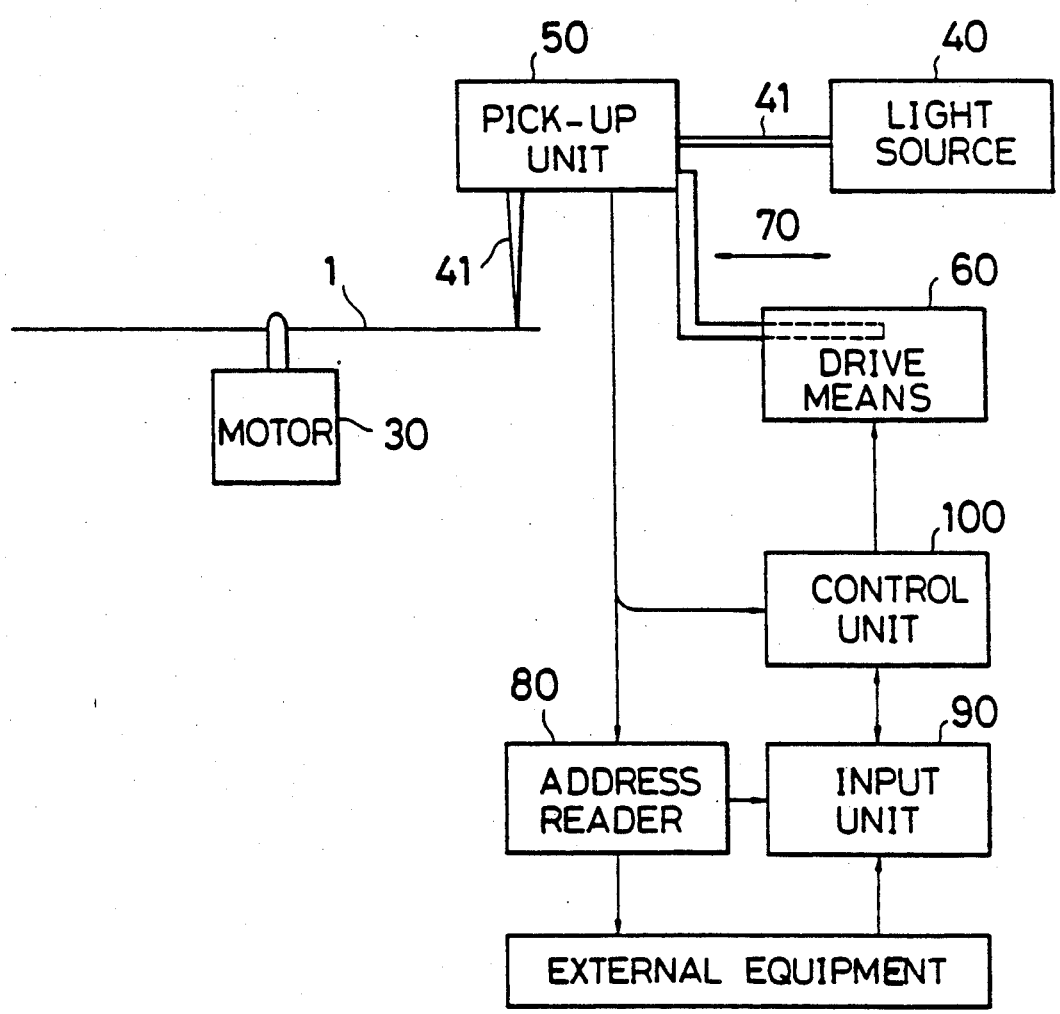
FIG. 2 is a block diagram of a track-seeking apparatus for use with an optical disk.
Figure 3:
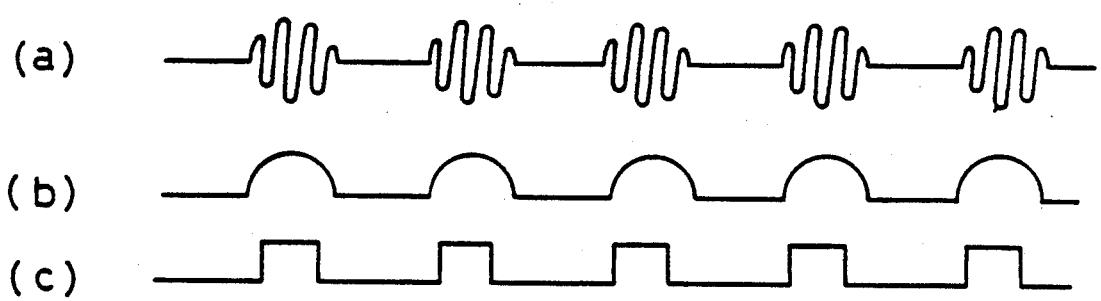
FIG. 3 (a)–(c), shows waveforms illustrating a prior-art scheme for detecting track crossings.
Figure 6:
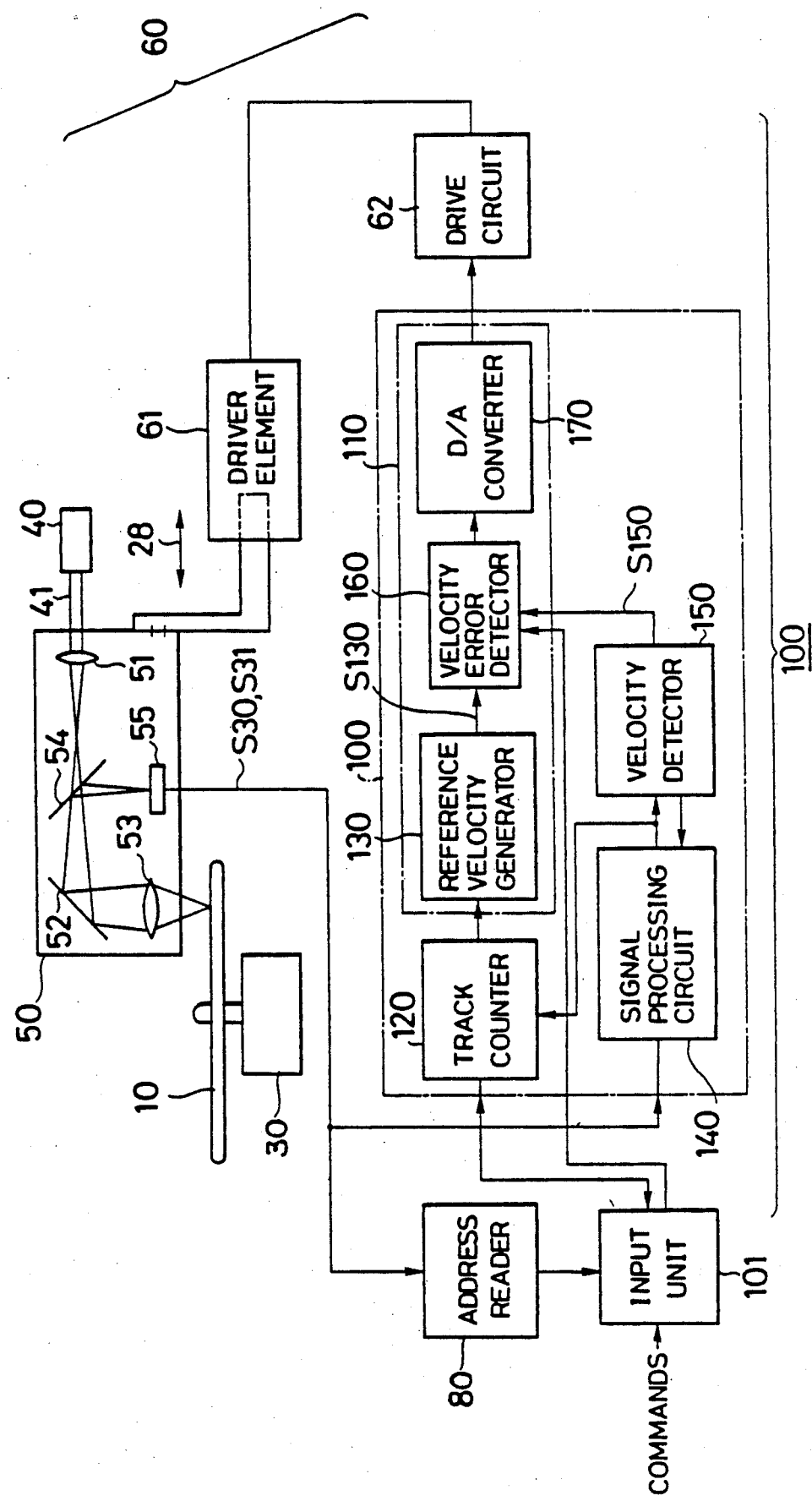
FIG. 6 is a block diagram of a track-seeking apparatus according to a first embodiment of the present invention.

FIG. 6 shows a block diagram of a track-seeking apparatus according to the first embodiment of the present invention. The overall structure of this track-seeking apparatus is as illustrated in FIG. 2, comprising a disk 10 like that shown in FIGS. 4 and 5, a motor 30, a light source 40, a pick-up unit 50, a driving means 60, an address reader 80, an input unit 101, and a control unit 100.

The light source 40 comprises, for example, a helium-neon laser for producing a narrow, coherent light beam 41. The input unit 101 comprises a device such as a single-chip microcomputer. The driving means 60 comprises a driver element 61 such as a DC motor or a linear motor which moves the pick-up unit 50, and a drive circuit 62 which converts the drive control signal S100 from the control unit 100 to the type of input signal required by the driver element 61.

The pick-up unit 50 comprises a field lens 51, a totally reflecting mirror 52 for changing the direction of the light beam 41 produced by the light source 40, a focusing lens 53 for focusing the light beam 41 onto the disk 10, a beam splitter 54 for separating the light reflected back from the disk 10, and a dual photodetector 55 for receiving the reflected light beam from the beam splitter 54 and converting it into a pair of electrical signals.

The control unit 100 comprises a velocity control means 110, a track counter 120, a signal processing circuit 140, and a velocity detector 150. The velocity control means 110 comprises a reference velocity generator 130 which may be in the form of a ROM, a velocity error detector 160, and a D/A converter 170. The track counter 120 holds the remaining track count. The reference velocity generator 130 receives this remaining track count and generates a corresponding reference velocity signal S130. The signal processing circuit 140 receives the output of the dual photodetector 55, detects track crossings, generates track crossing pulses, and provides as output a track detect signal S140 consisting either of these track-crossing pulses or of simulated track-crossing pulses received from the velocity detector 150. The velocity detector 150 receives the track detect signal S140 from the signal processing circuit 140, detects the velocity of the pick-up unit 50, and sends a pick-up velocity signal S150 to the velocity error detector 160. On the basis of the pick-up velocity, the velocity detector 150 also generates the simulated track-crossing pulses which indicate when the light beam 41 will cross tracks on the disk 10 if the pick-up unit 50 continues to move at the same velocity, and furnishes these simulated track-crossing pulses to the signal processing circuit 140. The velocity error detector 160 receives the reference velocity signal S130 from the reference velocity generator 130, the pick-up velocity S150 from the velocity detector 150, and a direction signal from the input unit 101 and generates a digital velocity error signal S160 which it sends to the D/A converter 170. The D/A converter 170 converts the digital velocity error signal S160 to an analog velocity error signal S170 which is supplied to the drive circuit 62.

Figure 7:
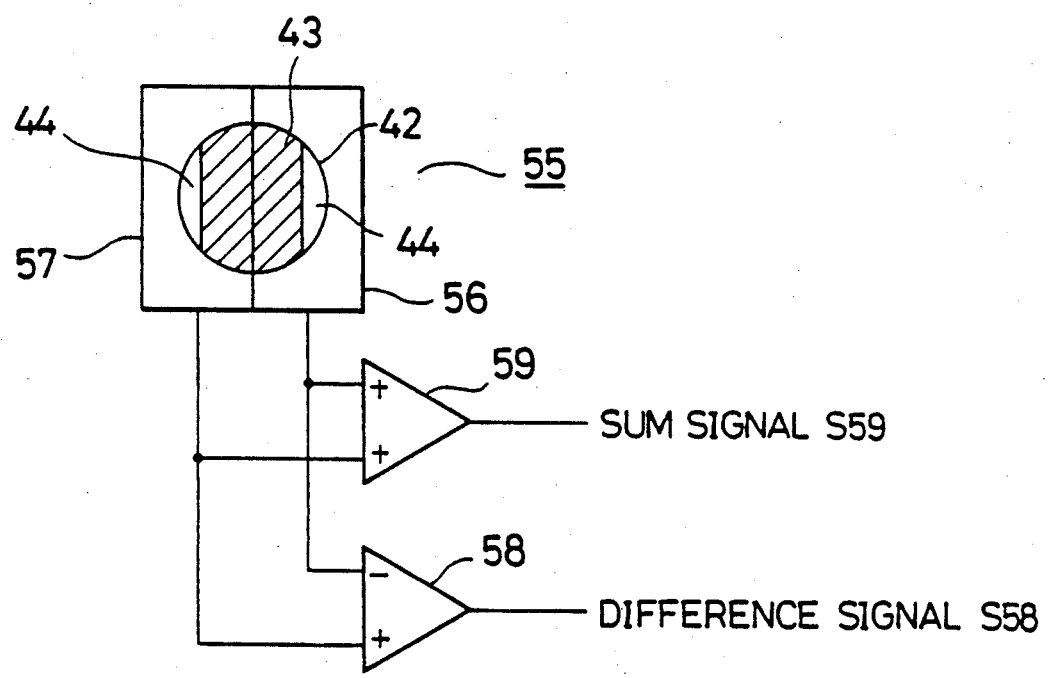
FIG. 7 is a schematic drawing of the dual photodetector in FIG. 6.

FIG. 7 shows a more detailed view of the dual photodetector 55 in the pick-up unit 50. The dual photodetector 55 comprises a first photodetector 56, a second photodetector 57, a difference amplifier 58, and a summing amplifier 59. The reflected light beam 41 forms a spot 42, part of which illuminates the first photodetector 57 and part of whih illuminates the second photodetector 58. In the drawing, the light beam 41 is centered on a pit 14 or a pregroove 15 in a track 11. The spot 42 comprises a lower-intensity portion 43 and a higher-intensity portion 44. The total intensity of light received by the two photodetectors 56 and 57 is low when the spot 42 is centered on a pregoove or a pit, while it is high when the spot is centered between tracks or pits. The difference between the intensities of the light received by the two photodetectors 56 and 57 is the largest when the spot 42 is centered on the edge of a pregroove or a pit. The first and second photodetectors 56 and 57 convert the incident light in the spot 43 to a pair of electrical signals of corresponding intensities, which they supply to the difference amplifier 58 and the summing amplifier 59. The difference amplifier 58 generates the difference S58 of these intensities; the summing amplifier 59 generates their sum S59.

Figure 8:
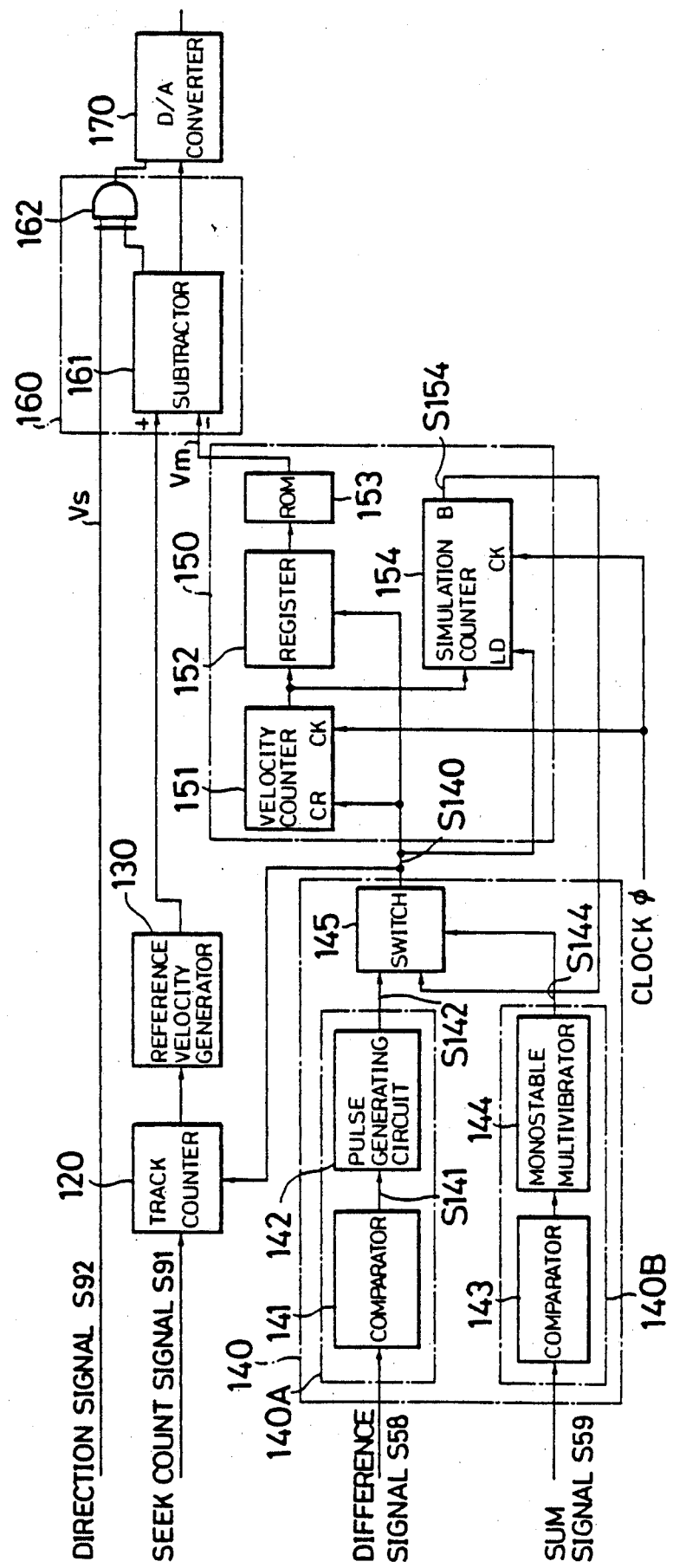
FIG. 8 is a detailed, schematic block diagram of the control unit in FIG. 6.

FIG. 8 is a block diagram showing the control unit 100 in greater detail. The track counter 120 is a down counter that is preset at the beginning of the seek operation to a seek count value S91 received from the input unit 101, this becoming the initial remaining track count. During the seek operation, the track counter 120 decrements the remaining track count by one for each track detect signal S140 received from the signal processing circuit 140. The remaining track count is continuously furnished to the reference velocity generator 130, which converts it to a reference velocity signal S130 indicating the velocity at which the pick-up unit 50 should be moving for the number of remaining tracks.

The signal processing circuit 140 in the control unit 100 comprises a track-crossing detection means 140A, an ID gating means 140B, and a switch 145. The track-crossing detection means 140A comprises a first comparator 141 and a pulse generating circuit 142. The first comparator 141 receives the difference signal S58 from the dual photodetector 55 and generates a binarized difference signal S141. The pulse generating circuit 142, which comprises circuit elements such as flip-flops and gates, receives the binarized difference signal S141 and generates a track-crossing signal S142. The ID gating means comprises a second comparator 143 and a monostable multivibrator 144. The second comparator 143 receives the sum signal S59 from the dual photodetector 55 and generates a binarized sum signal S143. The monostable multivibrator 144 receives the binarized sum signal S143 and generates an ID gate signal S144 which is High when the light beam 41 is in the ID field 13 of a track and Low at other times. This ID gate signal S144 is sent to the switch 145. According to the ID gate signal S144, the switch 145 selects either the track-crossing signal S142 or a simulated track-crossing signal S154 as the track detect signal S140.

The velocity detector 150 comprises a speed detection means consisting of a velocity counter 151, a register 152, and a ROM 153, and a simulation means 154. The velocity counter 151 is an up-counter that increments on a clock signal $\phi$ input at its CK input terminal, and is cleared by the track detect signal S140 output by the switch 145, which it receives at its CR (Count Reset) input terminal. The register 152 provides temporary storage for the count value of the velocity counter 151. The ROM 153 converts the value in the register 152 to the pick-up velocity signal S150 which it sends to the velocity error detector 160. The simulation means 154 is a down-counter which decrements on the clock signal $\phi$ which it receives at its CK input terminal and produces a simulated track-crossing pulse S154 from its B (Borrow) terminal when its count value reaches 0.

The velocity error detector 160 comprises a subtractor 161 and an XOR (exclusive-OR) gate 162. The subtractor 161 receives the reference velocity signal S130 from the reference velocity generator 130 and the pick-up velocity S150 from the velocity detector 150 and sends the absolute magnitude of their difference, comprising all bits of the difference except the most significant bit, to the D/A converter 170. The most significant bit of the difference, indicating the sign of the difference, is sent to the XOR gate 162. The other input of the XOR gate 162 is a direction signal S92 from the input unit 101. The output of the XOR gate 162 becomes the most significant bit of the input to the D/A converter 170. Due to this circuit configuration, the output of the D/A converter 170 indicates the correct magnitude and direction of the force to be applied by the driving means 60 to the pick-up unit 50 in order to cause the pick-up unit 50 to move in the desired direction at the reference velocity.

The operation of this embodiment will be explained with reference to FIGS. 9 to 12.

Figure 9:
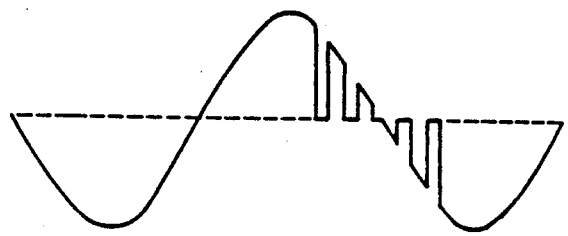
FIG. 9 illustrates waveforms output by the photodetector when the pick-up unit is moving at a relatively low velocity.
Figure 9:
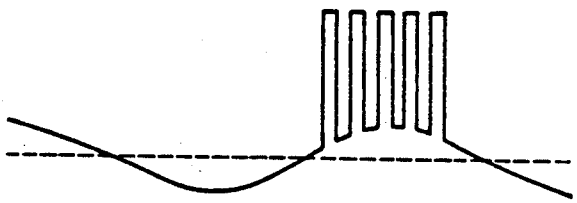
Figure 9:
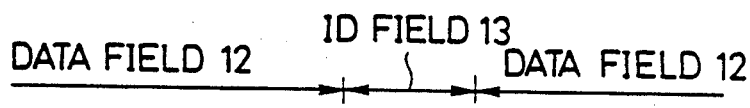
Figure 10:
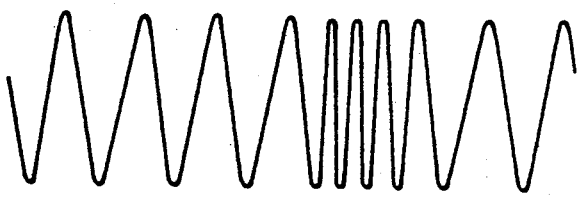
FIG. 10 illustrates waveforms output by the photodetector when the pick-up unit is moving at a relatively high velocity.
Figure 10:
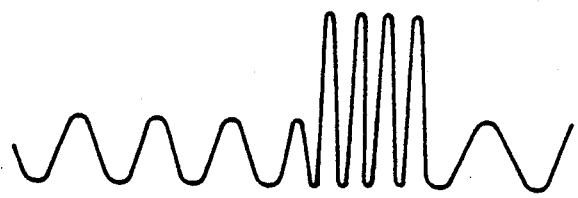
Figure 10:
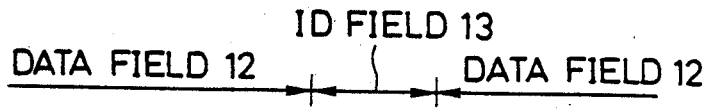

FIGS. 9 and 10 illustrate the sum signal S59 and the difference signal S58 output by the dual photodetector 55 when the light beam 41 crosses tracks at low speed (e.g., along a line LS in FIG. 5) and at high speed (e.g., along a line HS in FIG. 5), respectively. The main factor affecting the reflected light intensity is the physical pregrooves and pits on the disk; the effect of information recorded in the data fields in the tracks is relatively small in comparison, and the weak, high-frequency components that the recorded information introduces into the difference signal S58 and the sum signal S59 are not shown.

In the low-speed case illustrated in FIG. 9, when the track crossings occur in the data field 12 in FIG. 5, the sum signal S59 and difference signal S58 are approximately sinusoidal in shape. The difference signal S58 has a relatively large amplitude, with maxima and minima occurring when the light beam 41 is centered on the edge of a track. The sum signal has a relatively smaller amplitude, with maxima occurring when the light beam 41 is centered between tracks and minima occurring when the light beam 41 is centered on a track. Accordingly, in the data field, the frequency of both signals matches the rate at which tracks are crossed.

When the light beam 41 is in the ID field 13, however, the sum signal S59 and difference signal S58 contain strong high-frequency components caused by the physical pits in the ID field 13. Specifically, when the light beam 41 is directed at a location in the ID field 13 where there is no pit and the entire light beam 41 falls onto an area other than pits, light is reflected with high, equal intensity onto both halves of the dual photodetector 55, causing the difference signal S58 to become zero and the sum signal S59 to rise to a high value, as shown.

When the pick-up unit 50 is moving at high speed as in FIG. 10, the track-crossing frequency in the difference signal S58 approaches the signal frequency in the ID field 13. The same is true in the sum signal S59, and the amplitude of the sum signal S59 in the ID field 13 is greater than the amplitude of the sum signal S59 in the data field 12.

Figure 11:
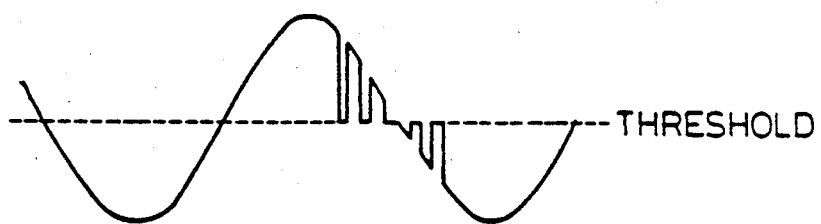
FIG. 11 shows how the waveforms in FIGS. 9 and 10 are processed in a track-seeking apparatus according to the first embodiment.
Figure 11:
Figure 11:
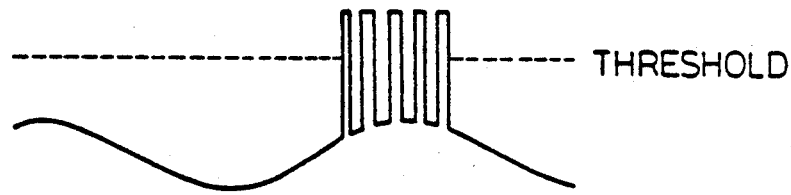
Figure 11:
Figure 11:

The manner in which the sum signal S59 and difference signal S58 are processed in the signal processing circuit 140 is illustrated in FIG. 11. The difference signal S58 is binarized by the first comparator 141 at a threshold level that detects signal transitions in both the ID field 13 and the data field 12. The track-crossing signal is derived from this binarized signal. The sum signal S59 is binarized by the second comparator 143 at a threshold level that detects only signal transitions in the ID field 13. The monostable multivibrator 144 which receives the binarized sum signal S143 generates a single ID gate pulse which rises on the first rising edge of the binarized sum signal received in the ID field 13 and has a duration (of a quasistable state) at least as long as the length of time during which the light beam 41 is in the ID field 13. This length of time is dependent of the speed of rotation of the disk, which is fixed, and the width (dimension along the circumference) of the ID field 13.

Figure 12:
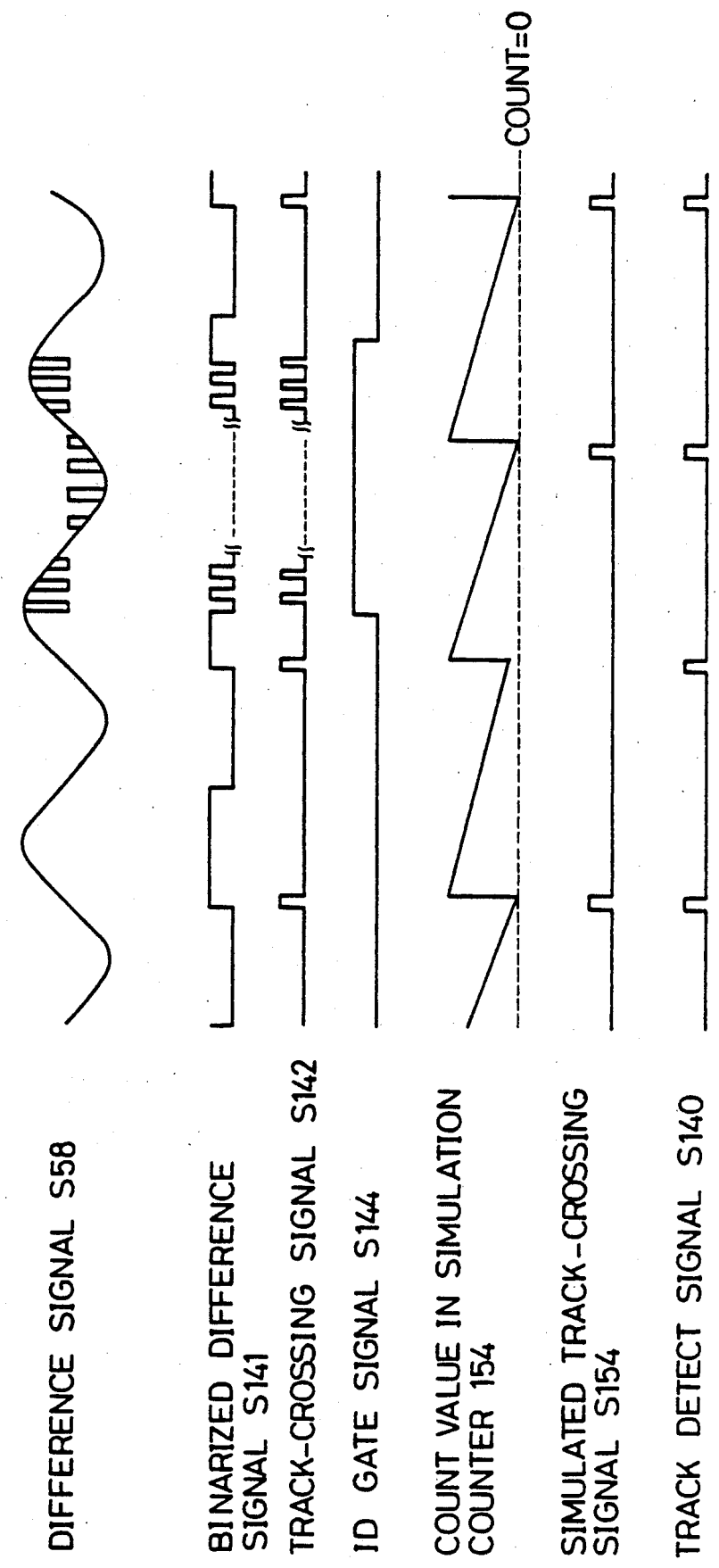
FIG. 12 is a timing chart illustrating the operation of a track-seeking apparatus according to the first embodiment.

The overall operation of the circuit in FIG. 6 will be explained with reference to a timing chart shown in FIG. 12.

The seek operation begins when the input unit 101 generates a seek count signal S91 and a direction signal S92 and the value of the seek count signal S91 is set in the track counter 120. According to the count value in the track counter 120, the reference velocity generator 130 generates a reference velocity signal S130 which is supplied to the velocity error detector 160. The pick-up velocity S150 is initially zero, so the velocity error signal S160 is equal in magnitude to the reference velocity signal S130, and causes the driving means 60 to start moving the pick-up unit 50 in the desired direction. As the pick-up unit 50 moves, the sum and difference signals S59 and S58 produced by the dual photodetector 55 in FIG. 7 are processed as explained in FIG. 11 to produce a track-crossing signal S142 and an ID gate signal S144.

When the ID gate signal S144 is Low, the switch 145 selects the pulse generating circuit 142, so the track-crossing signal S142 passes through the switch 145 and is furnished as the track detect signal S140 to the track counter 120, the velocity counter 151, the register 152, and the simulation means 154. Each time the light beam 41 crosses a track, the track counter 120 decrements by 1. The velocity counter 151 receives at its clock input terminal CK a clock signal φ having a frequency several times higher than the maximum frequency of the track-crossing pulse signal S142 and normally increments on this φ clock input until cleared by the track detect signal S140, which it receives at its CR terminal. The register 152 also receives the track detect signal S140, which causes it to latch the last count value in the velocity counter 151 before the velocity counter 151 is cleared by the track detect signal S140. The velocity counter 151 thus measures the time between two successive track-crossing pulses S142, and the register 152 stores the value corresponding to the time taken by the light beam 41 to move between the last pair of tracks. The ROM 153 converts the value in the register 152 to a speed value which it furnishes to the velocity error detector 160 as the pick-up velocity S150 of the pick-up unit 50. The velocity error detector 160 generates a velocity error signal S160, causing the driving means 60 to apply a force to the pick-up unit 50 to correct the velocity of the pick-up unit 50 so that it matches the desired reference velocity.

When the ID gate signal S144 is High, the circuit operation is the same except that the switch 145 selects the simulated track-crossing signal S154 produced by the simulation means 154 instead of the track-crossing signal S142 produced by the pulse generating circuit 142. The simulation means 154 is a down-counter that decrements on the φ clock signal at the same rate as the velocity counter 151 increments. The simulation means 154 also receives the outputs of the switch 145 and the velocity counter 151. When it receives a track detect pulse S140 from the switch 145, the simulation means 154 sets to the immediately preceding value received from the velocity counter 151, i.e., the value immediately before the velocity counter 151 is cleared by the track detect signal S140, which represents the time taken to move between the last pair of tracks, and begins counting down at a rate such that it will reach zero at exactly the time when the light beam 41 crosses the next track, provided the pick-up unit 50 continues to move at the same velocity. When its count reaches zero, the simulation means 154 generates a simulated track-crossing pulse S154 which is supplied to the switch 145. Since the ID gate signal S144 is High, the switch 145 selects this simulated track-crossing signal S154 instead of the signal S142. Thus the false track-crossing pulses caused by high-frequency components in the track-crossing signal S142 are ignored, and the tracks crossed by the pick-up unit 50 are counted correctly.

When the pick-up unit 50 is accelerating or decelerating, the simulated track-crossing signal S154 may depart slightly from the actual instant when track-crossing occurs. Accordingly, while the light beam 41 is in an ID field 13, the velocity detector 150 may not measure the actual velocity of the pick-up unit 50. The error will be corrected, however, when the light beam 41 emerges from the ID field 13.

When the ID gate signal S144 is Low, the simulation means 154 may fail to reach zero. This occurs when the pick-up unit 50 is accelerating, because the actual track-crossing pulse S142 arrives sooner than expected and sets the simulation means 154 to a new starting count before zero is reached. This failure to reach zero has no adverse effect, however, because while the ID gate signal S144 is Low, it is the track-crossing signal S142, not the simulated track-crossing signal S154, that is selected as the track detect signal S140.

When the remaining track count in the track counter 120 reaches zero, the seek operation halts and the input unit 101 is notified (by a signal not shown in FIG. 8). The input unit 101 reads the output of the address reader 80 and compares it with the specified address to confirm whether the desired track address has actually been reached. If the two addresses match, the seek operation is completed. If the two addresses do not match, the seek operation can be repeated by the same procedure as before, or it can be completed by a series of so-called "jump" operations which move the pick-up unit 10 to an adjacent track.

Next a second embodiment of this invention will be described with reference to FIGS. 13, 14, and 15. This embodiment is identical to the first embodiment except for the configuration of the signal processing circuit 140 in the control unit 100. Also, in the second embodiment the input unit 101 (FIG. 6) receives from the control unit 100 a signal indicating the pick-up velocity S150 of the pick-up unit 50, and sends to the signal processing circuit 140 a mode control signal S93, causing the output S142 of a low-pass filter 146 to be employed in place of the simulated track-crossing signal S154 when the pick-up unit 50 is moving slowly.

Figure 13:
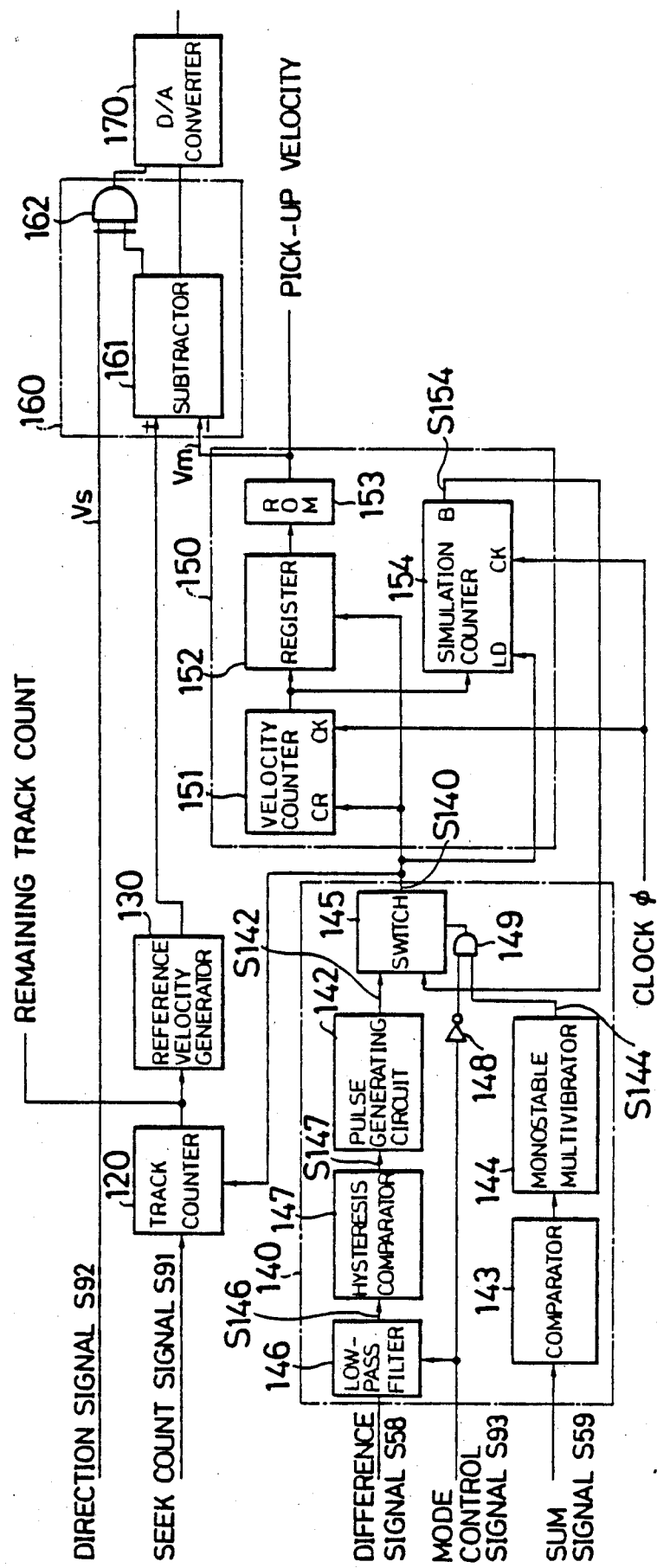
FIG. 13 is a schematic block diagram of the control unit of a track-seeking apparatus according to a second embodiment of this invention.

FIG. 13 is a block diagram of the control unit 100 according to the second embodiment of the invention. Elements identical to those in the first embodiment as shown in FIG. 8 are identified with the same reference numerals.

In the second embodiment, the signal processing circuit 140 comprises a low-pass filter 146 that receives the difference signal S58 from the dual photodetector 55 and the mode control signal S93 from the input unit 101, a hysteresis comparator 147 that receives the output of the low-pass filter 146, a pulse generating circuit 142 that receives the output of the hysteresis comparator 147 and generates a track-crossing signal S142, a second comparator 143 that receives the sum signal S59 from the dual photodetector 55, a monostable mulivibrator 144 that receives the output of the second comparator 143, an inverter 148 that receives the mode control signal S93 from the input unit 101, an AND gate 149 that receives the outputs of the monostable multivibrator 144 and the inverter 148, and a switch 145 that selects either the track-crossing signal S142 generated by the pulse generating circuit 142 or the simulated track-crossing signal S154 generated by the simulation means 154 according to the output of the AND gate 149.

The low-pass filter 146 can be switched on or off by the mode control signal S93. In the on state when the mode control signal S93 is High, the low-pass filter 146 blocks the high-frequency components of the difference signal S58; in the off state while the mode control signal S93 is Low, the filter action is bypassed and the difference signal S58 passes through unmodified. In either state, the output signal S146 of the low-pass filter 146 is supplied to the hysteresis comparator 147, which binarizes it and sends a binarized difference signal S147 to the pulse generating circuit 142. As in the first embodiment, the pulse generating circuit 142 generates a track-crossing signal S142 which it sends to the switch 145. The second comparator 143 and monostable multivibrator 144 function as in the first embodiment to produce an ID gate signal S144 which becomes one input of the AND gate 149. The other input of the AND gate 149 is the output of the inverter 148, which inverts the mode control signal S93 from the input unit 101. The switch 145 thus selects the track-crossing signal S142 when the control signal S93 is High or the ID gate pulse S144 is Low, and selects the simulated track-crossing pulse signal S154 when the control signal S93 is Low and the ID gate pulse S144 is High.

Figure 14:
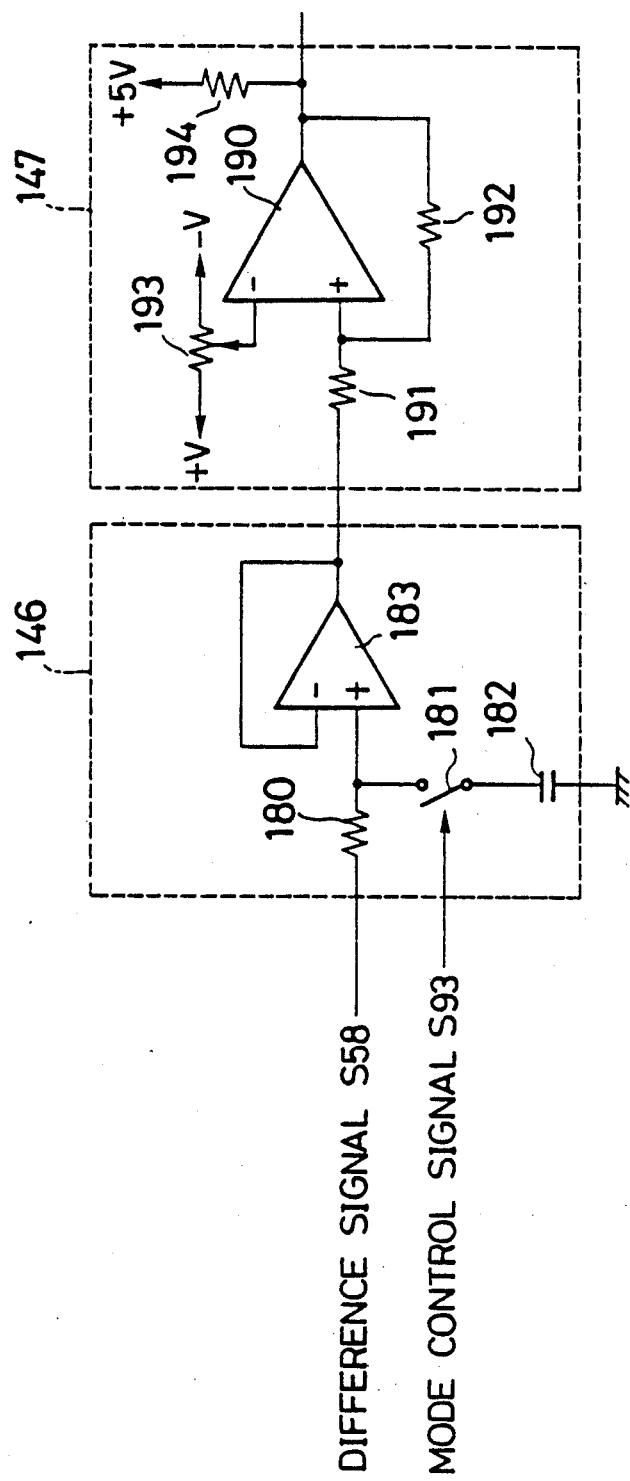
FIG. 14 is a schematic diagram of the low-pass filter and hysteresis is comparator in FIG. 13.
Figure 15:
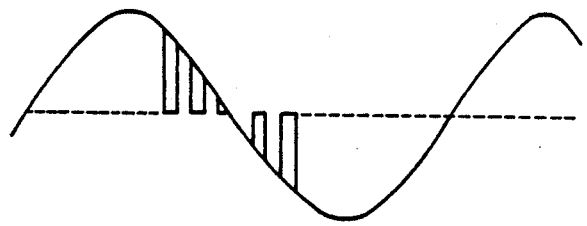
FIG. 15 shows waveforms illustrating the operation of the low-pass filter and hysteresis comparator in FIG. 14.
Figure 15:
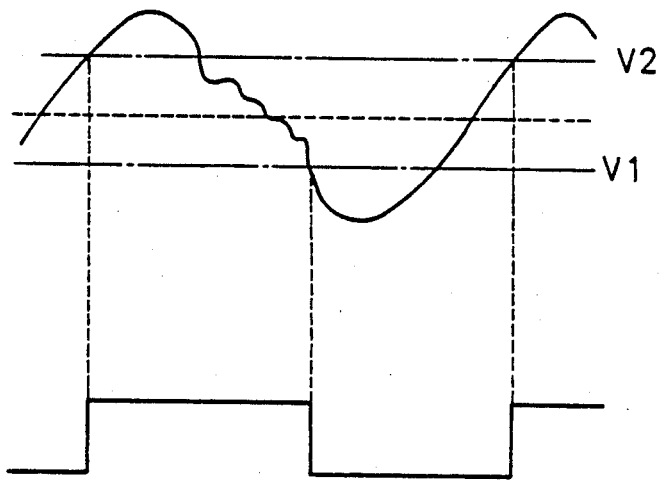

FIG. 14 is a schematic diagram of an embodiment of the low-pass filter 146 and the hysteresis comparator 147 in FIG. 13. The low-pass filter 146 comprises a resistor 180 connected in series with the input difference signal S58, a mode switch 181 which is connected through a capacitor 182 to ground, and an operational amplifier 183, one input of which is connected to both the resistor 180 and the mode switch 181. The mode switch 181 is turned on and off by the mode control signal S93. When the mode switch 181 is on, the resistor 180 and capacitor 182 act as a low-pass filter with a cutoff frequency $f_c$ given by the well-known formula:

$$f_c = 1/(2\pi RC)$$

where R is the resistance of the resistor 180 and C is the capacitance of the capacitor 182. R and C are chosen so that $f_c$ is well below the lowest frequency caused by the pits in the ID field 13 of any track.

The hysteresis comparator 147 has a voltage comparator 190, the positive input terminal of which is connected through a resistor 191 to the output of the operational amplifier 183. The output terminal of the voltage comparator 190 is connected through a resistor 192 to the positive input terminal of the comparator 190. The negative input terminal of the voltage comparator 190 is connected to a variable resistor 193 to which voltages of +V and −V are applied to create a reference voltage. The output terminal of the voltage comparator 190 is connected through a resistor 194 to a supply voltage of, for example, +5V.

The mode control signal S93 from the input unit 101 causes the signal-processing circuit 140 to operate in a first mode when the mode control signal S93 is Low and a second mode when the mode control signal S93 is High.

In the first mode, when the mode control signal S93 is Low, the mode switch 181 is off, the low-pass filter 146 is in the off state, and the difference signal S58 passes through the operational amplifier 183 and reaches the hysteresis comparator 147 without being filtered. The hysteresis comparator 147 binarizes the difference signal S58 to create a binarized difference signal S147, from which the pulse generating circuit 142 generates a track-crossing pulse signal S142 substantially identical to that in the first embodiment. In addition, since the output of the inverter 148 is High, the output of the AND gate 149 is identical to the ID gate signal S144 output by the monostable multivibrator 144. Accordingly, when the mode control signal S93 is Low, the second embodiment operates in the same way as the first embodiment.

The operation of the second embodiment in the second mode when the control signal S93 is High will be explained with reference to FIG. 15 which shows the difference signal S58, the filtered difference signal S146 output by the low-pass filter 146, and the binarized difference signal S147 output by the hysteresis comparator 147 when the light beam 41 passes through an ID field 13. Since the control signal S93 is High, the mode switch 181 is on and the low-pass filter 146 is in the on state. Since the high-frequency components caused during the passage of the light beam 41 through the ID field 13 lie well above the cutoff frequency $f_c$ of the low-pass filter 146, they are substantially removed from the output signal S146 of the low-pass filter 146, leaving only an approximately sinusoidal filtered difference signal S146 with a slight remaining ripple. Furthermore, the voltage thresholds of the hysteresis comparator 147 are located so that threshold V1 at which the binarized difference output signal S147 goes Low lies below the remaining ripple and the threshold V2 at which the binarized difference output signal S147 goes High lies above the remaining ripple. The binarized output of the pulse generating circuit 142 therefore correctly indicates just one track crossing, and the pulse generating circuit 142 generates just one track-crossing pulse S142. Furthermore, since the control signal S93 is High, the output of the inverter 148 is Low, hence the output of the AND gate 149 is Low, so the switch 145 selects the track-crossing signal S142 regardless of the state of the ID gate signal S144.

The input unit 101 controls the level of the mode control signal S93 according to the pick-up velocity S150 of the pick-up unit 10, which it receives from the ROM 153. When the pick-up velocity S150 is greater than a designated value, the input unit 101 makes the control signal S93 Low, placing the low-pass filter 146 in the off state and causing the control unit 100 to use the simulated track-crossing signal S154 when the light beam 41 crosses the data field 13 of a track. When the pick-up velocity S150 is less than the designated value, the input unit 101 makes the control signal S93 High, placing the low-pass filter 146 in the on state and disabling the simulated track-crossing pulse signal S154. Thus near the beginning and end of the seek operation, when the pick-up unit 50 is moving slowly, the effects of the ID field 13 are eliminated by the low-pass filter 146, enabling the track-crossing signal S142 to be used even in the ID field 13; in the middle part of the seek operation, when the pick-up unit 50 is moving more rapidly, these effects are eliminated by the ID gate signal S144 and the simulated track-crossing signal S154 is used in the ID field. The reason for this is as follows.

As noted in the first embodiment, the approximate nature of the simulated track-crossing signal 154 leads to error in measuring the pick-up velocity while the light beam 41 is in an ID field 13. The error is not large enough to be important in the beginning or middle of the seek operation, because it will be corrected by feedback after the light beam 41 emerges from the ID field 13. Near the end of the seek operation, however, there may not be enough time left for feedback to correct the pick-up velocity, and the pick-up unit 50 may fail to stop on the target track. This problem is eliminated by disabling the simulated track-crossing signal S154 near the end of the seek operation and using the low-pass filter 146 instead. Since the pick-up unit 10 is moving slowly, the low-pass filter 146 is able to reject the high-frequency components caused by the ID field 13 without also rejecting the approximately sinusoidal component that indicates track crossing.

When the pick-up unit 50 is moving rapidly in the middle part of the seek operation, the approximately sinusoidal track-crossing component would lie above the cutoff frequency $f_c$ of the low-pass filter 146, so the low-pass filter 146 is turned off and the simulated track-crossing signal S154 is substituted for the track-crossing signal S142 in the ID field 13. Since the pick-up unit 50 is still distant from the desired track, the track-seeking apparatus still has time to recover from any error introduced by the approximate nature of the simulated track-crossing signal S154.

In the second embodiment as described above, the low-pass filter 146 is switched on and the simulated track-crossing signal S154 is disabled in the low-speed intervals at both the beginning and end of the seek operation, but it is only the interval at the end of the seek operation that is critical. Accordingly, track counter 120 can furnish the remaining track count to the input unit 101, and the input unit 101 can be programmed to make the control signal S93 High only when the pick-up velocity S150 is less than a designated value and the number of remaining tracks is also less than a designated count.

The embodiments illustrated in the accompanying drawings do not limit the scope of this invention, which also encompasses many possible modifications not departing from the inventive concept. These include, for example, modifications in the structure of the pick-up unit, modifications in the configuration of the circuits used in the control unit, and modifications in the overall structure of the track-seeking apparatus.

What is claimed is:

1. A track-seeking apparatus for use with an optical disk in which information is recorded in spiral or concentric circular tracks having data fields with pregrooves and identifier fields with pits, comprising:

means for rotating said optical disk;

a pick-up unit for focusing a light beam onto said optical disk, detecting the light reflected from said optical disk, and converting it to at least one pick-up signal;

driver means for moving said pick-up unit parallel to said optical disk and across said tracks; and a control circuit for receiving at least one pick-up signal and at least one of control signals, one of said control signals being a seek count signal indicating the number of tracks the light beam must cross to reach a target track, and controlling said driver means according to said at least one pick-up signal and said at least one of control signals so that said driver means causes said pick-up unit to move from a current track to the target track, wherein said control circuit comprises:

track-crossing detection means for detecting track crossings by said light beam and generating a track-crossing signal;

velocity detection means for detecting the pick-up velocity at which said pick-up unit is moving and generating a pick-up velocity signal;

simulation means for generating a simulated track-crossing signal according to said pick-up velocity;

identifier gating means for detecting when said light beam is focused on one of said identifier fields;

a switch controlled by said identifier gating means, for producing a track detect signal that consists of said track crossing signal when said light beam is not focused on one of said identifier fields, and said simulated track-crossing signal when said light beam is focused on one of said identifier fields; and means for terminating the seek operation when, as a result of counting the track detect signal, said terminating means determines that said number of tracks indicated by said seek count signal has been crossed.

2. A track-seeking apparatus according to claim 1, wherein said identifier fields contain track address information and said apparatus further comprises an address reader for receiving said at least one pick-up signal and extracting the track address information, and means for examining, upon termination of the seek operation, whether the track the light beam is focused on is the target track.

3. A track-seeking apparatus according to claim 2, further comprising an input unit for receiving said track address information and external commands and generating the control signals.

4. A track-seeking apparatus according to claim 3, wherein said input unit is a microcomputer.

5. A track-seeking apparatus according to claim 1, further comprising a track counter for receiving said seek count signal and said track detect signal and generating a remaining track count.

6. A track-seeking apparatus according to claim 5, further comprising velocity control means for controlling said driver means according to said pick-up velocity and said remaining track count.

7. A track-seeking apparatus according to claim 1, wherein said pick-up unit has a dual photodetector for detecting the intensities of two separate parts of said reflected light and generating as pick-up signals a sum signal corresponding to the sum of said intensities and a difference signal corresponding to the difference of said intensities.

8. A track-seeking apparatus according to claim 7, wherein said track-crossing detection means comprises:
a first comparator for receiving said difference signal and generating a binarized difference signal that assumes one of two values depending on whether or not said difference signal exceeds a certain threshold; and
a pulse generating circuit for receiving said binarized difference signal and generating a track-crossing pulse on the rising edge of said binarized difference signal.

9. A track-seeking apparatus according to claim 7, wherein said identifier gating means comprises;
a second comparator for receiving said sum signal and generating a binarized sum signal that assumes one of two values depending on whether or not said sum signal exceeds a certain threshold, said threshold being high enough that it is exceeded only when said light beam is focused on one of said identifier fields; and
a monostable multivibrator for receiving said binarized sum signal, generating a pulse signal with a duration equal to or greater than the length of time said light beam remains in said identifier field, and sending said pulse signal to said switch.

10. A track-seeking apparatus according to claim 7, further comprising:
a low-pass filter for receiving said difference signal and generating a filtered difference signal from which high-frequency components produced by said identifier field are removed; and
mode control means responsive to a mode control signal for selecting a first mode in which said track detect signal consists of said simulated track-cossing signal, or a second mode in which said track detect signal consists of said track-crossing signal and said filtered difference signal is substituted for said difference signal in said control circuit.

11. A track-seeking apparatus according to claim 10, wherein said second mode is selected only when said pick-up velocity is less than a certain velocity threshold.

12. A track-seeking apparatus according to claim 10, wherein said second mode is selected only when said remaining track count is less than a certain count value.

13. A track-seeking apparatus according to claim 10, wherein one of the control signals is the mode control signal,
said low-pass filter comprises a resistor and a capacitor, and
said mode control means comprises:
a switch inserted between said resistor and said capacitor, and controlled by said mode control signal;
an inverter for inverting said mode control signal;
an AND gate for ANDing the output of said inverter with the output of said identifier gating means.

14. A track-seeking apparatus according to claim 10, wherein said track-detecting means comprises:
a hysteresis comparator for receiving said difference signal or said filtered difference signal and generating a binarized difference signal that assumes one of two values according to a pair of input thresholds: an upper threshold at which said binarized difference signal changes from its lower to its higher value; and a lower threshold at which said binarized difference signal changes from its higher to its lower value; and
a pulse generating circuit for receiving said binarized difference signal and generating a track-crossing pulse on the rising edge of said binarized difference signal.

15. A track-seeking apparatus according to claim 1, wherein said velocity detecting means comprises;
an up-counter for measuring the interval between successive pulses in said track detect signal;
a register for receiving and storing the count value in said up-counter at each pulse in said track detect signal; and
a read only memory for receiving said count value from said register and converting it to a velocity value.

16. A track-seeking apparatus according to claim 15, wherein said simulation means comprises a down-counter for receiving said count value from said up-counter and said track detect signal from said switch, counting down from said count value starting when said track detect signal is received, and generating a simulated track-crossing pulse upon reaching zero.

17. A track-seeking apparatus according to claim 1, further comprising an input unit for receiving track address information contained in said identifier fields and generating the control signals, a track counter for receiving said seek count signal and said track detect signal and generating a remaining track count, and velocity control means for controlling said driver means according to said pick-up velocity and said remaining track count, wherein one of the control signals generated by said input unit is a direction signal, and said velocity control means comprises:
reference velocity generating means for receiving said remaining track count and generating a reference velocity signal;

subtractor means for receiving said pick-up velocity signal and said reference velocity signal and generating a velocity difference;

an exclusive OR gate, the inputs of which are said direction signal and the most significant bit of said velocity difference; and digital-to-analog converting means for receiving said velocity difference signal with the output of said exclusive OR gate substituted for the most significant bit and generating an analog velocity error signal.

* * * * *